(12) United States Patent
Ikai et al.

(10) Patent No.: US 10,444,733 B2
(45) Date of Patent: Oct. 15, 2019

(54) ADJUSTMENT DEVICE AND ADJUSTMENT METHOD

(71) Applicant: FANUC CORPORATION, Minamitsuru-gun, Yamanashi (JP)

(72) Inventors: Satoshi Ikai, Yamanashi (JP); Naoto Sonoda, Yamanashi (JP); Ryoutarou Tsuneki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 58 days.

(21) Appl. No.: 15/944,308

(22) Filed: Apr. 3, 2018

(65) Prior Publication Data
US 2018/0292808 A1 Oct. 11, 2018

(30) Foreign Application Priority Data
Apr. 7, 2017 (JP) ................. 2017-076706

(51) Int. Cl.
*G06N 20/00* (2019.01)
*G05B 13/00* (2006.01)
(Continued)

(52) U.S. Cl.
CPC ... *G05B 19/40937* (2013.01); *G05B 13/0265* (2013.01); *G05B 15/00* (2013.01);
(Continued)

(58) Field of Classification Search
CPC ........... B25J 9/163; G06N 3/08; G06N 20/00; G05B 13/0265; G05B 15/00
See application file for complete search history.

(56) References Cited

U.S. PATENT DOCUMENTS 9,754,204 B2 * 9/2017 Li .................... G05B 13/027
2015/0258679 A1 * 9/2015 Izhikevich ............ B25J 9/0081
700/250
(Continued)

FOREIGN PATENT DOCUMENTS

CN 102467113 5/2012
JP 3-259303 11/1991
(Continued)

*Primary Examiner* — Ronald D Hartman, Jr.
(74) *Attorney, Agent, or Firm* — Wenderoth, Lind & Ponack, L.L.P.

(57) ABSTRACT

An adjustment device that controls a control device controlling motors driving at least two axes, and a machine learning device performing machine learning with respect to the control device. The adjustment device includes: a start command output unit configured to output a start command for starting the machine learning device; a feedback information acquisition unit configured to acquire feedback information acquired on the basis of an evaluation program executed by the control device, from the control device; a feedback information transmission unit configured to transmit the feedback information acquired, to the machine learning device; a parameter setting information acquisition unit configured to acquire control parameter setting information acquired by machine learning using the feedback information, from the machine learning device; and a parameter setting information transmission unit configured to transmit the control parameter setting information acquired, to the control device.

16 Claims, 13 Drawing Sheets

(51) Int. Cl.
*G05B 15/00* (2006.01)
*G05B 19/4093* (2006.01)
*G06N 3/08* (2006.01)
*G05B 13/02* (2006.01)
*G05B 19/18* (2006.01)

(52) U.S. Cl.
CPC ............... *G05B 19/18* (2013.01); *G06N 3/08* (2013.01); *G06N 20/00* (2019.01); *G05B 2219/31103* (2013.01); *G05B 2219/41437* (2013.01)

(56) References Cited

U.S. PATENT DOCUMENTS

| | | | | |
|---|---|---|---|---|
| 2015/0258683 | A1* | 9/2015 | Izhikevich | B25J 9/163 700/250 |
| 2017/0154283 | A1* | 6/2017 | Kawai | G06N 3/0427 |
| 2018/0181089 | A1* | 6/2018 | Fuji | G05B 13/0265 |
| 2018/0210406 | A1* | 7/2018 | Shimizu | G05B 13/0265 |
| 2018/0222048 | A1* | 8/2018 | Hasegawa | B25J 9/163 |
| 2018/0222057 | A1* | 8/2018 | Mizobe | B25J 9/1697 |
| 2018/0267499 | A1* | 9/2018 | Tsuneki | G05B 19/318 |
| 2018/0292808 | A1* | 10/2018 | Ikai | G05B 13/0265 |
| 2018/0341244 | A1* | 11/2018 | Xu | G06N 20/00 |
| 2018/0373223 | A1* | 12/2018 | Ikai | G05B 19/404 |
| 2019/0028043 | A1* | 1/2019 | Oho | H02P 6/17 |
| 2019/0101891 | A1* | 4/2019 | Iijima | G06N 20/00 |
| 2019/0137969 | A1* | 5/2019 | Watanabe | G06N 20/00 |
| 2019/0155245 | A1* | 5/2019 | Oosawa | G05B 19/25 |
| 2019/0175100 | A1* | 6/2019 | Etleb | A61B 5/6892 |
| 2019/0196417 | A1* | 6/2019 | Uno | G06N 20/00 |

FOREIGN PATENT DOCUMENTS

| | | |
|---|---|---|
| JP | 4-324507 | 11/1992 |
| JP | 6063016 | 1/2017 |
| JP | 2018-152012 | 9/2018 |

* cited by examiner

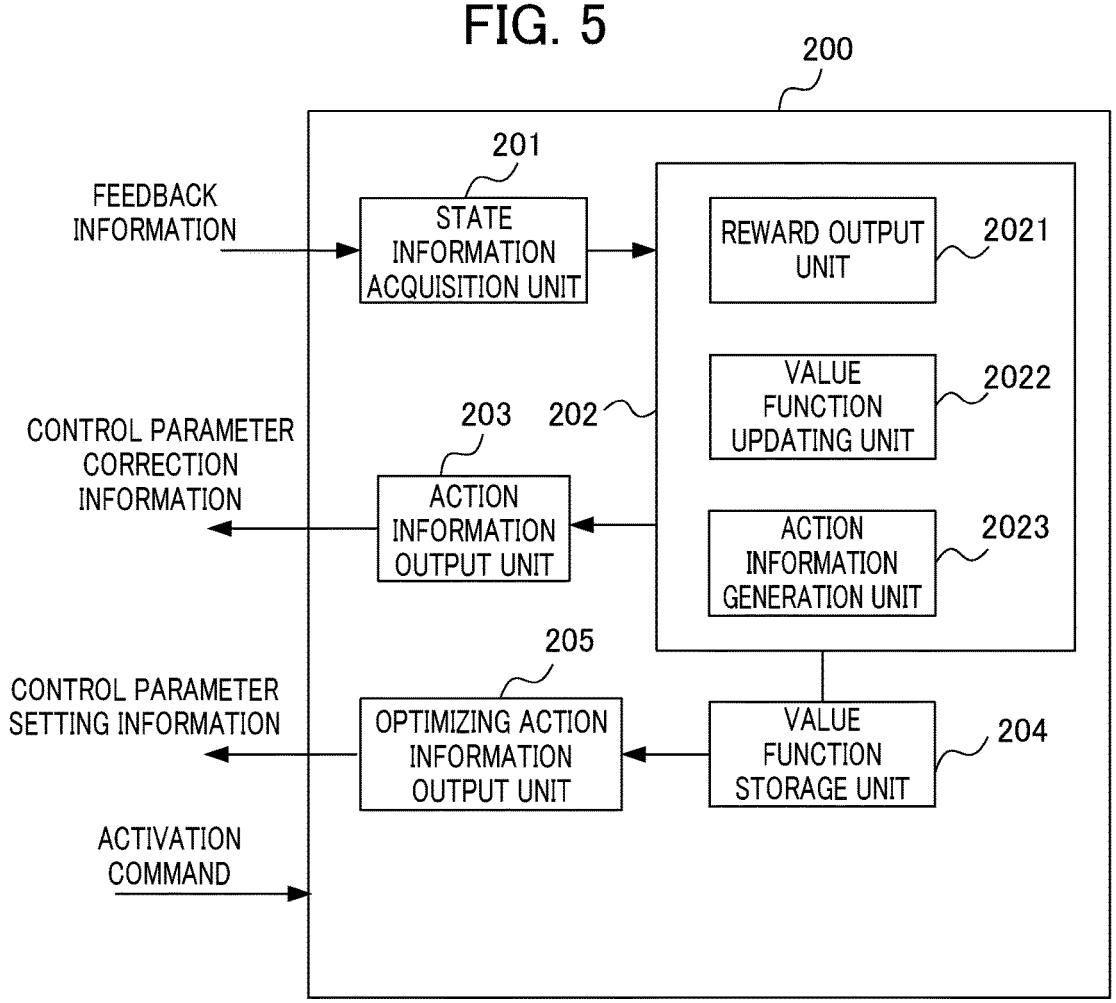

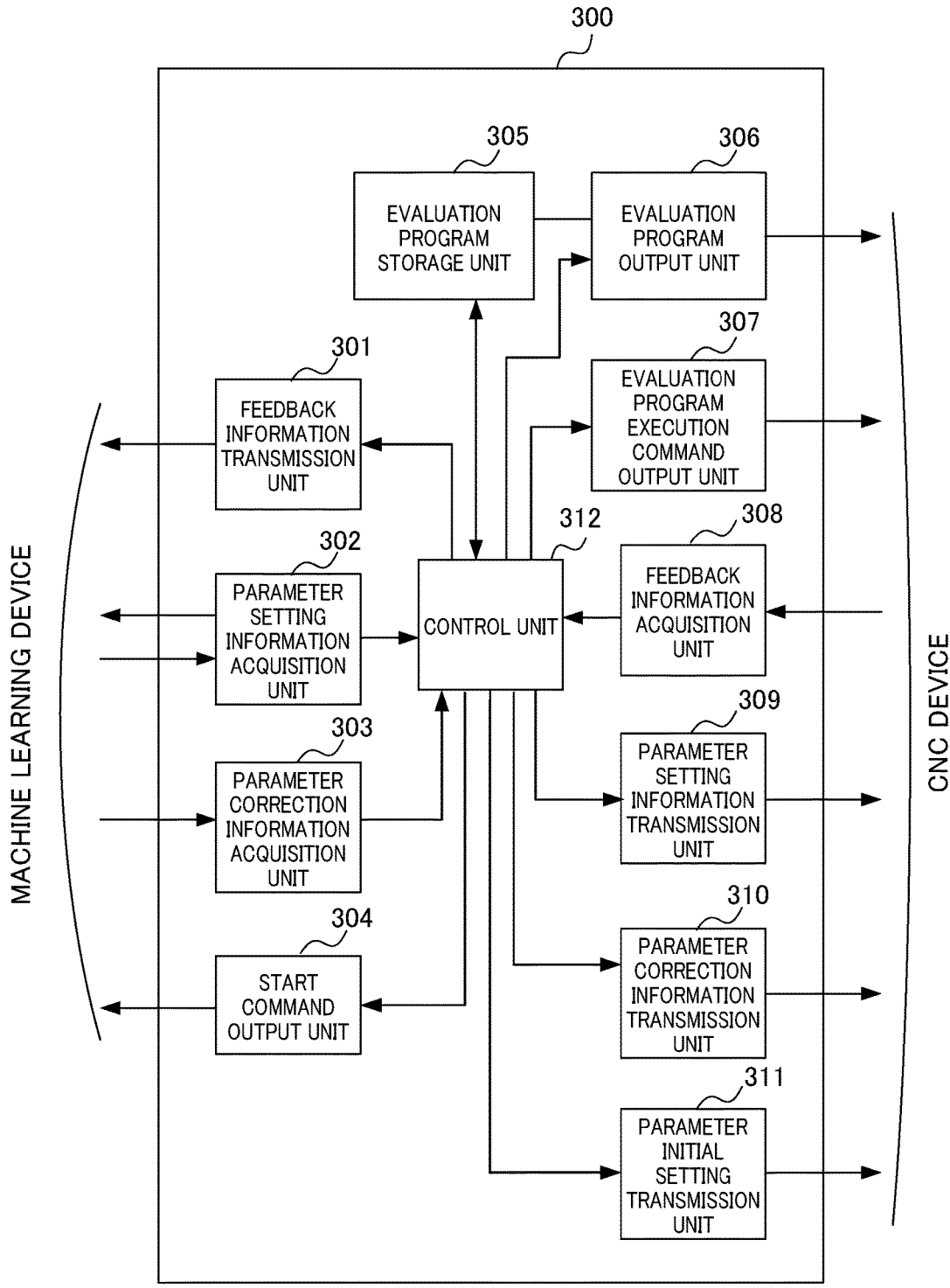

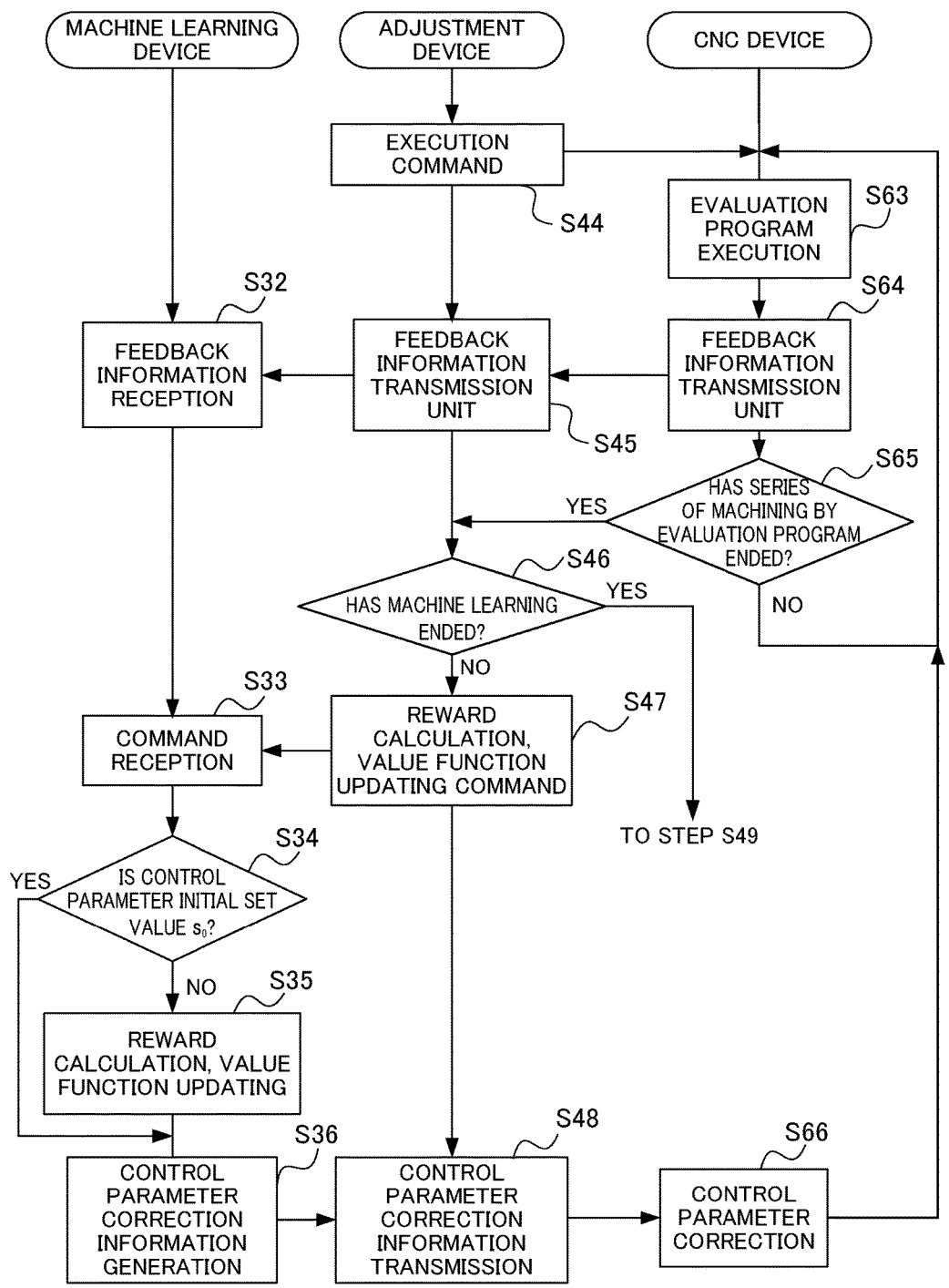

ADJUSTMENT DEVICE AND ADJUSTMENT METHOD

This application is based on and claims the benefit of priority from Japanese Patent Application No. 2017-076706, filed on 7 Apr. 2017, the content of which is incorporated herein by reference.

BACKGROUND OF THE INVENTION

Field of the Invention

The present invention relates to an adjustment device that controls a control device controlling motors driving at least two axes, and a machine learning device performing machine learning with respect to the control device, and an adjustment method of the adjustment device.

Related Art

For example, Patent Document 1 discloses a machine learning device that learns an operation command with respect to a motor used in a machine tool. The machine learning device disclosed in Patent Document 1 is a machine learning device that observes a power feeding amount with respect to the motor, temperature of the motor, a load of the motor, and vibration of the motor, as state variables, and learns whether the operation command with respect to the motor needs to be compensated, according to the state variables, and a result of determination of whether abnormality occurs in the machine tool based on the state variables.

Patent Document 1: Japanese Patent No. 6063016

SUMMARY OF THE INVENTION

When learning is performed by using a machine learning device, it is desirable that machine learning is performed with a machining program of a workpiece to be actually machined by a machining tool. However, machining processing with a machining program generally takes longer time, and adjustment takes much time for machine learning. A machine learning device needs to perform machine learning every time when a workpiece to be machined varies. Thus, this is not suitable for machining a small quantity of various items. Thus, it is desirable that an evaluation program other than the machining program is used for precision evaluation of a machining tool.

An object of the present invention is to provide an adjustment device and an adjustment method that appropriately control learning using a machine learning device when an evaluation program for machine learning other than machining program, or the like, is used.

(1) An adjustment device according to the present invention is an adjustment device (for example, adjustment devices 300, 320, 330 described later) that controls a control device (for example, CNC devices 100, 100A, 110, 120, 130 described later) configured to control motors driving at least two axes, and a machine learning device (for example, machine learning devices 200, 210, 220 described later) configured to perform machine learning with respect to the control device, the adjustment device including: a start command output unit (for example, a start command output unit 304 described later) configured to output a start command for starting the machine learning device; a feedback information acquisition unit (for example, a feedback information acquisition unit 308 described later) configured to acquire feedback information acquired on the basis of an evaluation program executed by the control device, from the control device;
a feedback information transmission unit (for example, a feedback information transmission unit 301 described later) configured to transmit the feedback information acquired, to the machine learning device;
a parameter setting information acquisition unit (for example, a parameter setting information acquisition unit 302 described later) configured to acquire control parameter setting information acquired by machine learning using the feedback information, from the machine learning device; and
a parameter setting information transmission unit (for example, a parameter setting information transmission unit 309 described later) configured to transmit the control parameter setting information acquired, to the control device.

(2) In the adjustment device of (1) described above, the adjustment device may include: a storage unit (for example, an evaluation program storage unit 305 described later) configured to store the evaluation program; and an evaluation program output unit (for example, an evaluation program output unit 306 described later) configured to output the evaluation program to the control device.

(3) In the adjustment device of (1) or (2) described above, the adjustment device may include an evaluation program execution command output unit (for example, an evaluation program execution command output unit 307 described later) configured to transmit an execution command for causing the evaluation program to be executed, to the control device.

(4) In any of adjustment devices of (1) to (3) described above, when two or more axes are driven by the motors, the feedback information acquisition unit may acquire the feedback information from the control device, to transmit the feedback information to the machine learning device.

(5) In any of the adjustment devices of (1) to (4) described above, the feedback information may include at least one of a position command, position feedback, and position error.

(6) In the adjustment device of (5) described above, the feedback information may further include at least one of a velocity command, velocity feedback, and velocity error.

(7) In the adjustment device of (5) described above, the feedback information may further include at least one of a current command, current feedback, and current error.

(8) In any of the adjustment devices of (1) to m described above, the machine learning is reinforcement learning,
the feedback information acquisition unit acquires the feedback information as state information from the control device, and
the adjustment device may include a parameter correction information transmission unit (for example, a parameter correction information transmission unit 310 described later) configured to transmit control parameter correction information acquired from the machine learning device, as action information, to the control device.

(9) In any of the adjustment devices of (1) to (8) described above, the control device includes at least one of a position feedforward calculation unit (for example, a position feedforward calculation unit 1020 described later), a velocity feedforward calculation unit (for example, a velocity feedforward calculation unit 1021 described later), and a current feedforward calculation unit (for example, a current feedforward calculation unit 1025 described later). At least one of the position feedforward calculation unit, the velocity feedforward calculation unit, and the current feedforward calculation unit may be performed with setting of a control parameter by the control parameter setting information.

(10) In any of the adjustment devices of (1) and (3) to (9) described above, the control device may store the evaluation program.

(11) In any of the adjustment devices of (1) to (10) described above, the adjustment device (for example, an adjustment de vice 320 described later) may include the machine learning device (for example, a machine learning device 200 described later).

(12) In any of the adjustment devices of (1) to (10) described above, the adjustment device (for example, an adjustment device 300 described later) may be included in the machine learning device (for example, a machine learning device 210 described later).

(13) In any of the adjustment devices of (1) to (10) described above, the control device (for example, a CNC device 110 described later) may include the machine learning device (for example, the machine learning device 200 described later).

(14) In any of the adjustment devices of (1) to (10) described above, the adjustment device may be included in the control device (for example, a control device 120 described later), and may include the machine learning device (for example, the machine learning device 200 described later).

(15) In any of the adjustment devices of (1) to (10) described above, the adjustment device (for example, an adjustment device 300 described later) may be included in the machine learning device (for example, a machine learning device 220 described later), and the machine learning device may be included in the control device (for example, a control device 130 described later).

(16) In an adjustment method according to the present invention is an adjustment method of an adjustment device (for example, adjustment devices 300, 320, 330 described later) that controls a control device (for example, CNC devices 100, 100A, 110, 120, 130 described later) configured to control motors driving at least two axes, and a machine learning device (for example, machine learning devices 200, 210, 220 described later) configured to perform machine learning with respect to the control device. The adjustment method is a method including:

starting the machine learning device, acquiring feedback information acquired on the basis of an evaluation program executed by the control device, from the control device, transmitting the feedback information acquired, to the machine learning device, acquiring control parameter setting information acquired by machine learning using the feedback information, from the machine learning device, and transmitting the control parameter setting information acquired, to the control device.

According to the present invention, in a system including a machine learning device and a control device, for learning using an evaluation program, the learning using the machine learning device can be appropriately controlled. In the control device including the machine learning device, learning using the machine learning device can be appropriately controlled.

BRIEF DESCRIPTION OF THE DRAWINGS

FIG. 5 is a block diagram showing a machine learning device 200 according to the first embodiment. FIG. 6 is a block diagram showing a configuration example of an adjustment device 300 of the first embodiment. FIG. 7B is a flowchart explaining learning operation of the adjustment system 10.

DETAILED DESCRIPTION OF THE INVENTION

Embodiments of the present invention will be described in detail below with reference to drawings.

First Embodiment

Figure 1:
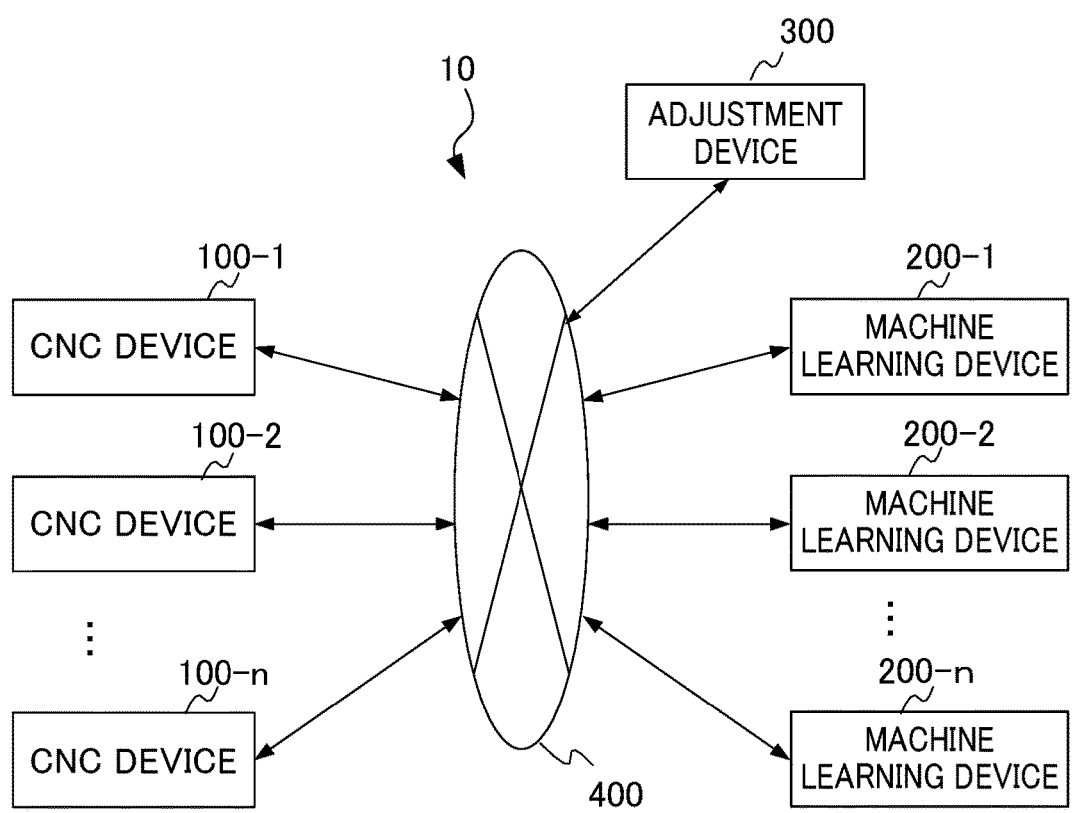
FIG. 1 is a block diagram showing an adjustment system of a first embodiment of the present invention.

FIG. 1 is a block diagram showing an adjustment system of a first embodiment of the present invention. As shown in FIG. 1, an adjustment system 10 of the present embodiment includes n computerized numerical control (CNC) devices 100-1 to 100-n, n machine learning devices 200-1 to 200-n, an adjustment device 300, and a network 400. Note that n is an arbitrary natural number. The CNC device corresponds to a control device, and is one of a numerical control device.

The CNC device 100-1 and the machine learning device 200-1 are considered to be a set of one-to-one, and are communicatively connected with the adjustment device 300 via the network 400. The CNC devices 100-2 to 100-n and the machine learning devices 200-2 to 200-n are connected as similar to the CNC device 100-1 and the machine learning device 200-1. The adjustment device 300 and the CNC devices 100-1 to 100-n, and the adjustment device 300 and the machine learning devices 200-1 to 200-n are directly connected via a connection interface, or connected via a network, and can perform communication with each other. The network is, for example, a local area network (LAN) constructed in a factory, the Internet, a public telephone network, or combination thereof. Particular communication method in the network, which connection, wired connection or wireless connection, is used, and the like, are not limited particularly.

Figure 2:
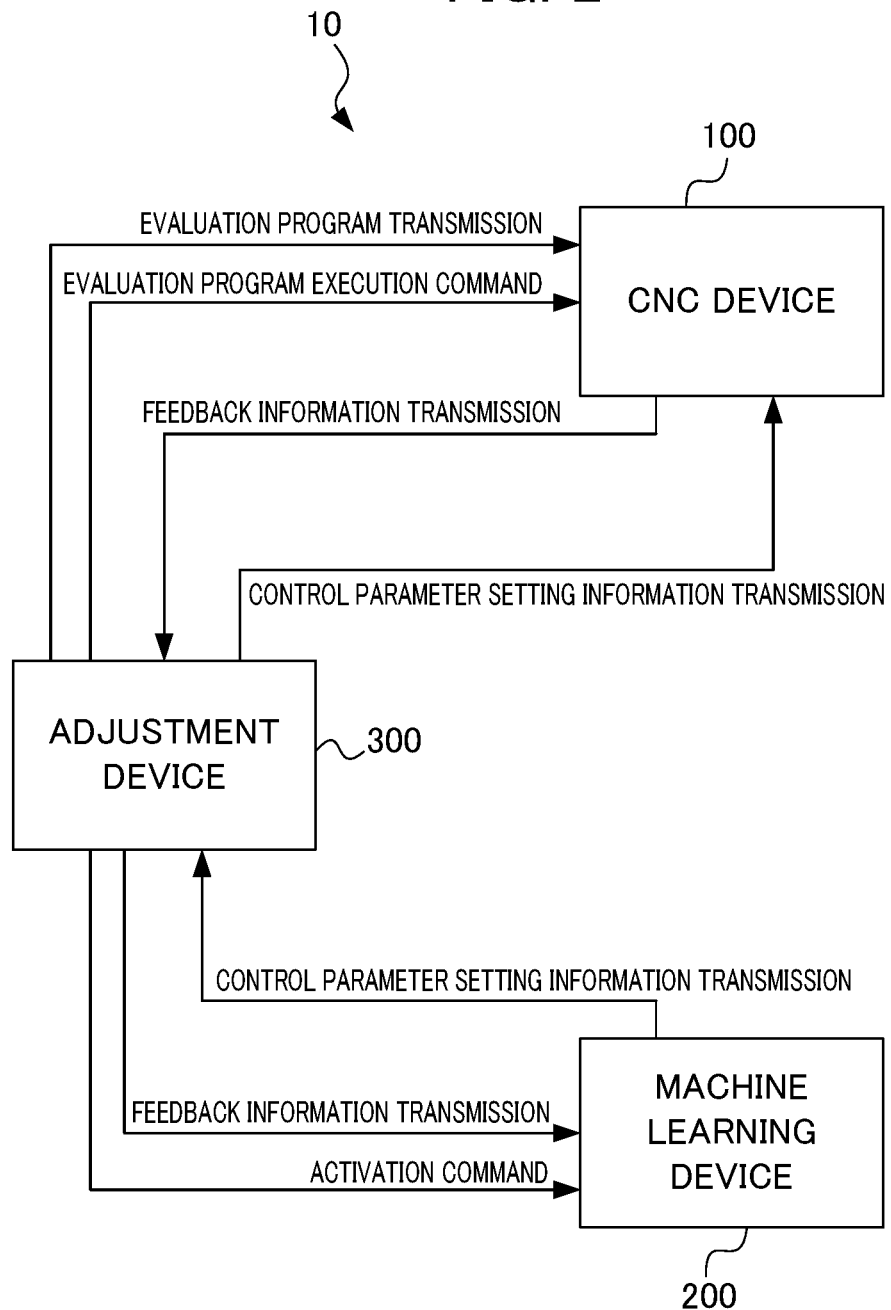
FIG. 2 is a block diagram showing a main signal flow among a CNC device, a machine learning device, and an adjustment device.

FIG. 2 is a block diagram showing a main flow of a signal among the CNC device, the machine learning device, and the adjustment device. Before a control target is actually controlled by the CNC device 100, the adjustment device 300 controls the CNC device 100 and the machine learning device 200 so that learning is performed by the machine learning device 200 in order to set a control parameter of the CNC device 100 to be an appropriate value. The CNC device 100 and the machine learning device 200 are one of n sets of n CNC devices 100-1 to 100-n and n machine learning devices 200-1 to 200-n. As shown in FIG. 2, the adjustment device 300 transmits an evaluation program executed at the time of learning, in the CNC device 100, and transmits a start command to the machine learning device 200. Next, the adjustment device 300 transmits an execution command of the evaluation program to the CNC device 100. The CNC device 100 executes the evaluation program, and transmits feedback information acquired on the basis of the evaluation program executed, to the adjustment device 300. The adjustment device 300 transmits the feedback information acquired, to the machine learning device 200. Next, the machine learning device 200 performs machine learning by using the feedback information, and transmits parameter setting information acquired by the machine learning, to the adjustment device 300. The adjustment device 300 transmits the parameter setting information acquired, to the CNC device 100. In this way, the CNC device 100 is set to have appropriate control parameters. The CNC device 100 and the machine learning device 200 may be directly connected via a connection interface, or may be connected via a network, to transmit and receive a part of signals transmitted and received via the adjustment device 300 shown in Fig.2, with the CNC device 100 and the machine learning device 200 not via the adjustment device 300. When the operator causes the evaluation program to be executed in the CNC device 100, the execution command of the evaluation program may not be transmitted from the adjustment device 300 to the CNC device 100.

Hereinafter, each of configurations of the CNC device 100 serving as a control device, the machine learning device 200, and the adjustment device 300 will be described. In the description below, an example in which the machine learning device 200 performs reinforcement learning of the control parameter of the CNC device 100, will be described.

<CNC Device 100>

Figure 3:
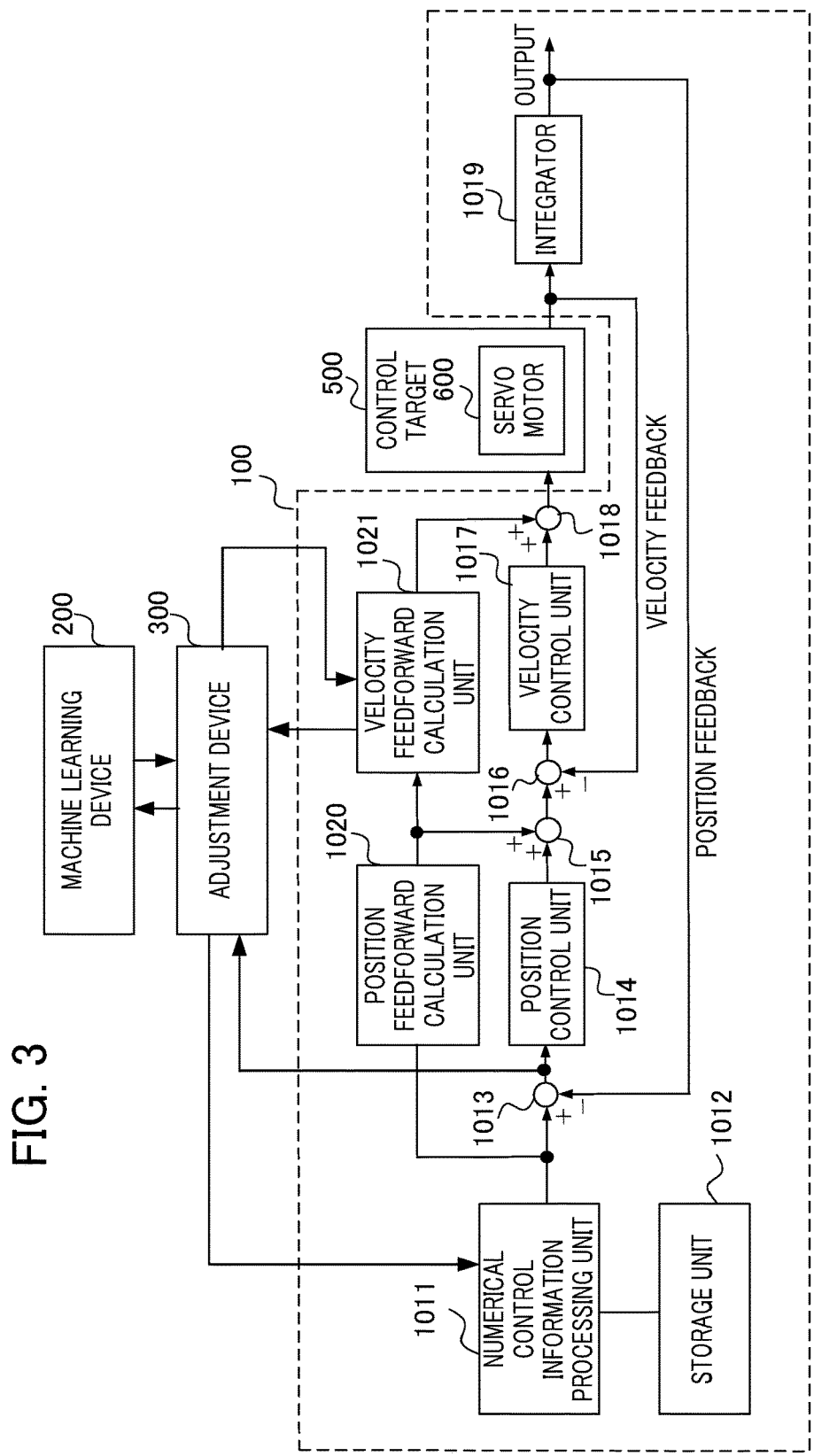
FIG. 3 is a block diagram showing a configuration example of a CNC device 100.

FIG. 3 is a block diagram showing a configuration example of the CNC device. For convenience of explanation, FIG. 3 also shows the adjustment device 300 and the machine learning device 200. As shown in FIG. 3, the CNC device 100 controls a servo motor 600 of a control target 500. The servo motors 600 are provided by the number corresponding to the number of axes when there are two or more axes to be controlled. In the present embodiment, the evaluation program operates at least two axes. Thus, at least two servo motors are provided. Here, the servo motor is used as a motor. However, other motors such as a spindle motor may be used as a motor. The control target 500 is, for example, a servo motor, or a machine tool, a robot, or an industrial machine including a servo motor. The CNC device 100 may be provided as a part of a machine tool, a robot, an industrial machine, or the like. Hereinafter, an example in which the control target 500 is a machine tool including a servo motor, will be described. AS shown in FIG. 3, the CNC device 100 includes a numerical control information processing unit 1011, a storage unit 1012, a subtractor 1013, a position control unit 1014, an adder 1015, a subtractor 1016, a velocity control unit 1017, an adder 1018, an integrator 1019, a position feedforward calculation unit 1020, and a velocity feedforward calculation unit 1021. Components of the CNC device 100 excluding the numerical control information processing unit 1011 and the storage unit 1012 are provided for each servo motor. The storage unit 1012 stores the evaluation program. The evaluation program is a machining program used in the CNC device 100 at the time of learning by the machine learning device 200. The evaluation program is provided separately from the machining program used at the time of actual machining such as cutting and machining. The evaluation program is transmitted from the adjustment device 300 described later to the numerical control information processing unit 1011. The numerical control information processing unit 1011 stores the evaluation program in the storage unit 1012.

The numerical control information processing unit 1011 reads the evaluation program from the storage unit 1012 to execute the evaluation program, on the basis of the execution command from the adjustment device 300 described later. Thereby, the numerical control information processing unit 1011 generates a position command value on the basis of a code included in the evaluation program, to output the position command value to the subtractor 1013. The numerical control information processing unit 1011 creates the position command value by setting a feed rate so that the geometry specified by the evaluation program is obtained. The subtractor 1013 receives the position command value from the numerical control information processing unit 1011, and determines a difference between the position command value and a detection position obtained by position feedback, to output the difference to the position control unit 1014, as position error, and transmit the difference to the adjustment device 300 described later.

The position control unit 1014 outputs a value obtained by multiplying a position gain Kp to the position error, to the adder 1015, as a velocity command value. The position feedforward calculation unit 1020 outputs a value obtained by differentiating the position command value and multiplying a feedforward coefficient to the differentiated value, to the adder 1015 and the velocity feedforward calculation unit 1021.

The adder 1015 adds the velocity command value to an output value of the position feedforward calculation unit 1020, to output the obtained value to the subtractor 1016 as a feedforward controlled velocity command value. The subtractor 1016 determines a difference between an output of the adder 1015, and the velocity detection value obtained by velocity feedback, and outputs the difference to the velocity control unit 1017 as velocity error.

The velocity control unit 1017 adds a value obtained by multiplying an integration gain K1v to the velocity error and integrating the obtained value, to a value obtained by multiplying an integral gain K2v to the velocity error, and outputs the obtained value to the adder 1018 as a torque command value.

The velocity feedforward calculation unit 1021 performs velocity feedforward calculation processing represented by a transfer function Gf(s) represented by, for example, formula 1 (shown as formula 1 below), to output the obtained value to the adder 2027.

$$Gf(s) = \frac{b_0 + b_1 s + b_2 s^2 + \ldots}{a_0 + a_1 s + a_2 s^2 + \ldots} \qquad \text{[Formula 1]}$$

In the first embodiment, when dimension of the transfer function Gf(s) is set to be a value set in advance, the machine learning device 200 performs machine learning so that coefficients $a_i$, $b_j$ are optimal. Hereinafter, the coefficients $a_i$, $b_j$ are also described as control parameters of the CNC device 100.

The adder 1018 adds the torque command value, to an output value of the velocity feedforward calculation unit 1021, and outputs the obtained value to the servo motor 600 of the control target 500 as a feedforward controlled current command value (torque command value).

A rotation angle position of the servo motor 600 of the control target 500 is detected by a rotary encoder serving as a position detection unit associated with the servo motor 600. A detected signal is utilized as the velocity detection value with which velocity' feedback is performed. The velocity detection value is integrated by the integrator 1019, and is utilized as the position detection value with which position feedback is performed. The CNC device 100 is configured as above.

Next, the evaluation program actually executed in the machine tool at the time of machine learning, will be described. As described above, when the machine learning device 200 performs machine learning of the control parameters of the CNC device 100, it is preferable that the machine learning device 200 causes the CNC device 100 to perform operation of all machining items, to perform machine learning. However, the machine learning device 200 cannot cause the CNC device 100 to perform operation of all machining items to perform machine learning, actually. Thus, instead, the evaluation program for performing machining operation that is suitable for machine learning, is set in advance. For example, the evaluation program specifies a movement distance in an axis direction, a feed rate, and the like, by the geometry of at the time of learning. The machining geometry at the time of learning is, for example, a circle, a square, and a square with quarter arcs R.

Figure 4A:
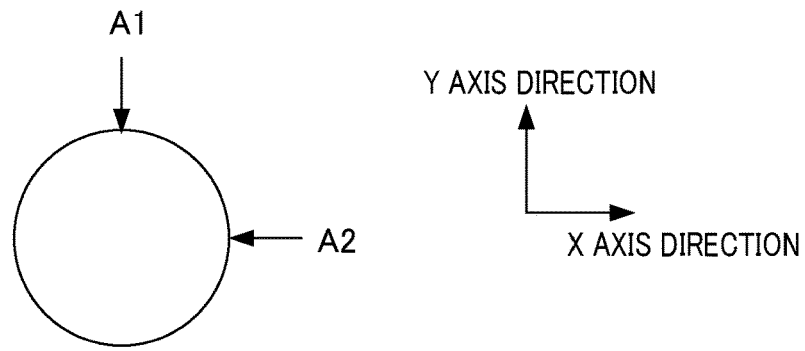
FIG. 4A is a diagram for explaining motion of servo motors when the geometry is a circle.
Figure 4B:
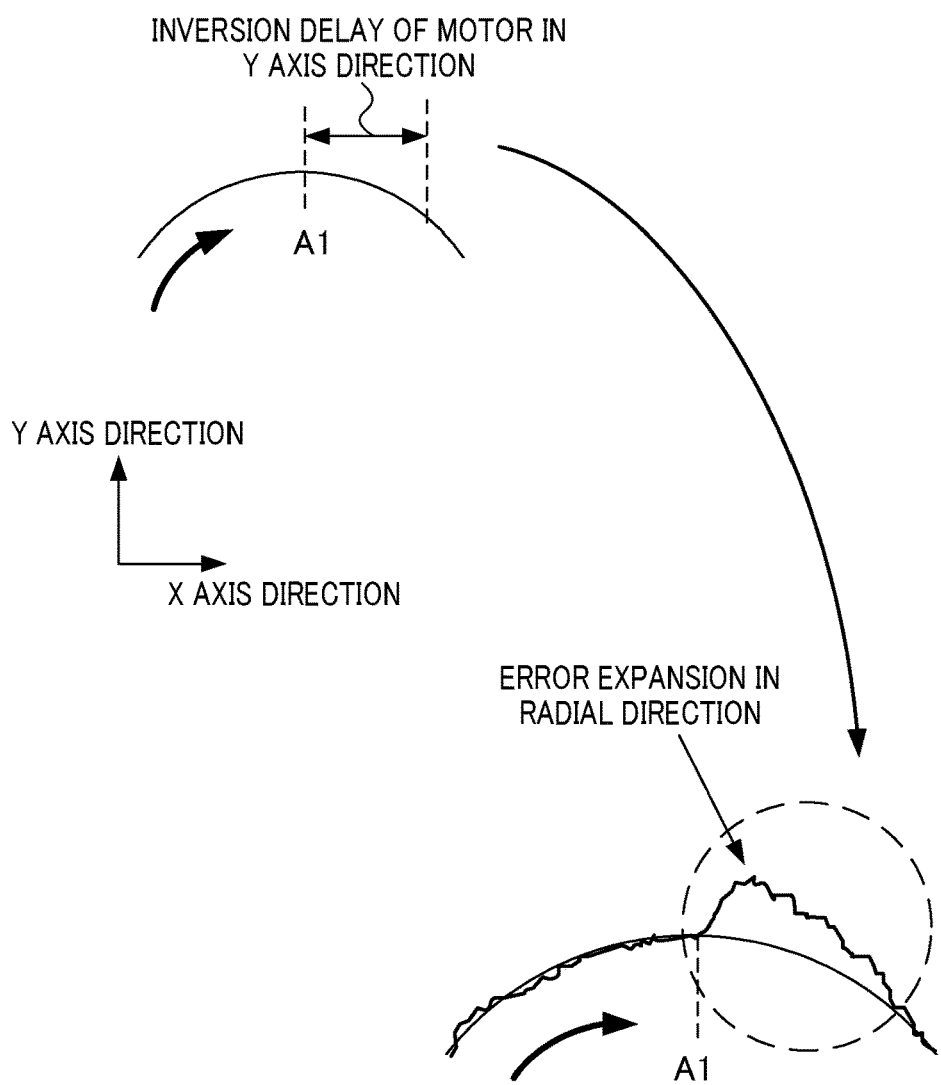
FIG. 4B is an explanation diagram showing a path error generated due to inertial running at the time when the geometry is a circle, and a rotation direction of the servo motors that moves a table in a Y axis direction is about to be inverted at a position A1.
Figure 4C:
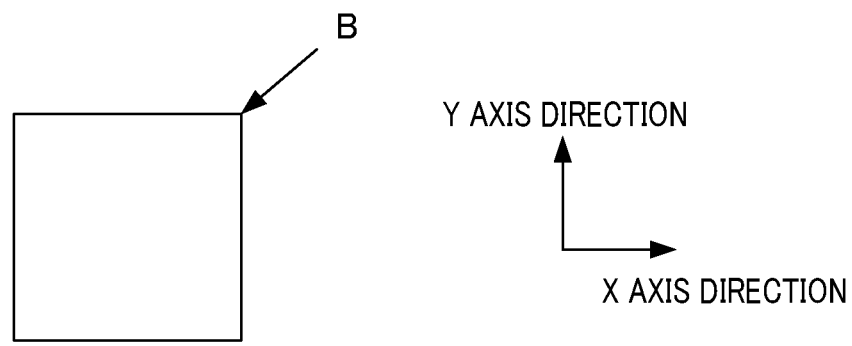
FIG. 4C is a diagram for explaining motion of the servo motors when the geometry is a square.
Figure 4D:
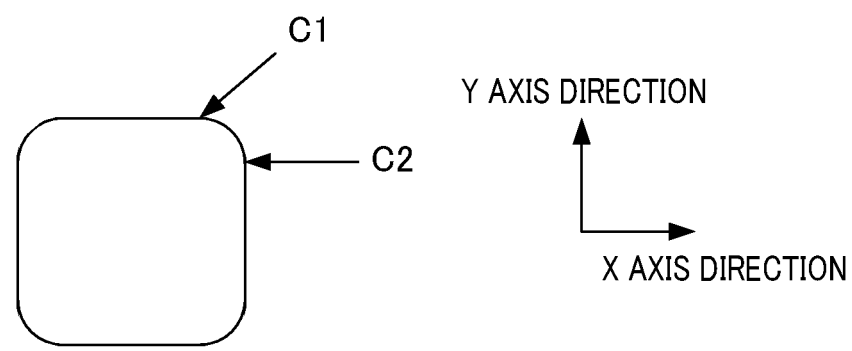
FIG. 4D is a diagram for explaining motion of the servo motors when the geometry is a square with quarter arcs R.

FIG. 4A and FIG. 4B are diagrams for explaining motion of the servo motors when the geometry is a circle. FIG. 4C is a diagram for explaining motion of the servo motors when the geometry is a square. FIG. 4D is a diagram for explaining motion of the servo motors when the geometry is a square with quarter arcs R. In FIG. 4A to FIG. 4D, the table moves so that the workpiece is machined in a clockwise direction.

When the geometry is a circle, as shown in FIG. 4A, the rotation direction of the servo motor that moves the table in the Y axis direction, is inverted at a position A1, and the table moves so as to be linearly inverted in the Y axis direction. At a position A2, the rotation direction of the servo motor that moves the table in the X axis direction is inverted, and the table moves so as to be linearly inverted in the X axis direction. FIG. 4B is an explanatory diagram showing a path error generated due to inertial running when the geometry is a circle, and the rotation direction of the servo motor that moves the table in the Y axis direction is about to be inverted, at the position A1. As shown in FIG. 4B, when the rotation direction of the servo motor that moves the table in the Y axis direction is about to be inverted at the position A1, inversion delay occurs, and the path error expands in a radial direction. When the path error is expanded and displayed, the path error is seen as a projection.

When the geometry is a square, as shown in FIG. 4C, the servo motor that moves the table in the Y axis direction makes a transition from stopping to rotation motion at a position B, the servo motor that moves the table in the X axis direction makes a transition from rotation to stopping, and the table makes a transition from linear motion in the X axis direction to linear motion in the Y axis direction.

When the geometry is a square with quarter arcs R, as shown in FIG. 4D, the servo motor that moves the table in the Y axis direction makes a transition from stopping to rotation motion at a position C1, and the table makes a transition from the linear motion in the X axis direction to arc motion. The servo motor that moves the table in the X axis direction makes a transition from rotation to stopping at a position C2, and the table makes a transition from the arc motion to linear motion in the Y axis direction. By the geometry specified by the evaluation program described above, inertial running (inertially moving) that occurs when the rotation direction is inverted, a transition is made from rotation state to stopping, and the like, is evaluated, and influence on the position error is checked.

When such evaluation program is executed at the time of learning, the numerical control information processing unit 1011 outputs the position command value so that the geometry sequentially becomes a circle, a square, and a square with quarter arcs R. The numerical control information processing unit 1011 changes the feed rate for each geometry of a circle, a square, and a square with quarter arcs R, and enables learning also the influence on a plurality of feed rates. The numerical control information processing unit 1011 may change the feed rate in a middle of moving of a shape of the geometry, for example, when the table passes a corner in moving of the table into a square geometry.

<Machine Learning Device 200>

Next, the machine learning device 200 in the first embodiment will be described. As described above, the machine learning device 200 performs reinforcement learning of the control parameters $a_i$, $b_j$. More particularly, the machine learning device 200 performs Q-learning in which a servo state such as a command and feedback, including values of control parameters $a_i$, $b_j$ (i, j≥0), and position error information of the CNC device 100 acquired by executing the evaluation program, is set as a state s, and adjustment of the control parameters $a_i$, $b_j$ related to the state s, is set as the action a. As is known to a person skilled in the art, an object of the Q-learning is to select the action a having the highest value Q (s, a) as an optimal action, from among actions a that can be taken, in a state s.

Particularly, an agent (machine learning device) selects various actions a under a state s, and gives a reward with respect to a state change occurred due to the actions a at that time. Then, the agent selects a better action on the basis of the given reward, to learn the correct value Q (s, a).

The agent tries to finally obtain Q (s, a)=$E[\Sigma(\gamma^t)r_t]$, in order to maximize the total reward that can be obtained in the future. E [ ] represents an expected value, t represents time, γ represents a parameter called a discount rate described later, $r_t$ represents a reward at the time t, and Σ represents the total by the time t. The expected value in this formula is an expected value in a case where the state is changed according to the suitable action. An updating formula of such value Q (s, a) can be represented by, for example, the following formula 2 (shown as formula 2 below).

$$Q(s_{t+1}, a_{t+1}) \leftarrow Q(s_t, a_t) + \alpha\left(r_{t+1} + \gamma \max_a Q(s_{t+1}, a) - Q(s_t, a_t)\right)$$ [Formula 2]

In the formula 2 described above, $s_t$ represents an environmental state at the time t, and $a_t$ represents an action at the time t. The state is changed to $s_{t+1}$ by the action $a_t$. $r_{t+1}$ represents a reward obtained by the state change. An item added with max is obtained by multiplying γ to the Q value when the action a having the highest Q value that has been identified at that time, is selected, under the state $s_{t+1}$. The γ is a parameter of 0<γ≤1, and is called a discount rate. α is a learning coefficient, and is in a range of 0<α≤1. The formula 2 described above represents a method of updating the value Q ($s_t$, $a_t$) of the action $a_t$ in the state $s_t$, on the basis of the reward $r_{t+1}$ sent back as a result of a trial $a_t$.

The machine learning device 200 observes the state information s including a servo state such as a command and feedback, including at least position error information of the CNC device 100, to determine the action a. The position error information is acquired by executing the evaluation program that is set in advance, on the basis of the control parameters $a_i$, $b_j$. The state information corresponds to the feedback information. The machine learning device 200 calculates the reward r for every time when the action a is performed. The machine learning device 200 sets the reward r as follows. When the state information s is corrected to be state information s' by the action information a, a value of the position error of the CNC device 100 that has operated on the basis of the control parameters $a_i$, $b_j$ after the correction related to the state information s', is larger than the value of the position error of the CNC device 100 that has operated on the basis of the control parameters $a_i$, $b_j$ before the correction related to the state information s before the correction by the action information a, the machine learning device 200 sets a reward value to be a negative value.

On the other hand, when the value of the position error of the CNC device 100 that has operated on the basis of the control parameters $a_i$, $b_j$ after the correction related to the state information s' corrected by the action information a, is smaller than the value of the position error of the CNC device 100 that has operated on the basis of the control parameters $a_i$, $b_j$ before the correction related to the state information s before the correction by the action information a, the machine learning device 200 sets the reward value to be a positive value. In the Q-learning, the machine learning device 200, for example, searches an optimal action a so that the total of rewards r in the future is the maximum, through trial and error. Thereby, the machine learning device 200 can select the optimal action a (that is, the optimal control parameters $a_i$, $b_j$) with respect to the state s including the servo state such as a command and feedback, including the position error information of the CNC device 100 acquired by executing the evaluation program that is set in advance, on the basis of the control parameters $a_i$, $b_j$.

FIG. 5 is a block diagram showing the machine learning device 200 of the first embodiment of the present invention. In order to perform the reinforcement learning described above, as shown in FIG. 5, the machine learning device 200 includes a state information acquisition unit 201, a learning unit 202, the action information output unit 203, a value function storage unit 204, and an optimizing action information output unit 205. The learning unit 202 includes a reward output unit 2021, a value function updating unit 2022, and an action information generation unit 2023.

The state information acquisition unit 201 acquires a state information s to be the feedback information including the servo state such as the command and the feedback in the CNC device 100, from the CNC device 100 via the adjustment device 300 described later. This state information s corresponds to an environmental state s in the Q-learning. The servo state includes at least the position error information of the CNC device 100. The position error information is acquired by executing the evaluation program that is set in advance on the basis of the control parameters $a_i$, $b_j$ in the CNC device 100. The state information acquisition unit 201 outputs the acquired state information s to the learning unit 202. The control parameters $a_i$ at the time when the Q-learning starts for the first time, are generated in advance by the adjustment device 300 described later according to designation by the user. In the present embodiment, initial set values of the control parameters $a_i$, $b_j$ generated by the adjustment device 300 described later are adjusted to be more optimal values by the reinforcement learning. The control parameters $a_i$, $b_j$ are set, for example, as initial set values, to be $a_0=1$, $a_1=0$, $b_0=0$, and $b_1$=(an inertia value of a control target). Dimensions m, n of the coefficients $a_i$, $b_j$ are set in advance. That is, the "i" of the coefficient $a_i$ is set to be 0≤i≤m, and the "j" of the coefficient $b_j$ is set to be 0≤j≤n.

The learning unit 202 is a unit that learns the value Q (s, a) when an action a is selected under an environmental state s. Particularly, the learning unit 202 includes the reward output unit 2021, the value function updating unit 2022, and the action information generation unit 2023.

The reward output unit 2021 calculates the reward r when the action a is selected under a state s, as described above.

The value function updating unit 2022 performs the Q-learning on the basis of the state s, the action a, the state s' when the action a is applied to the state s, and the reward value r calculated as described above, to update a value function Q that the value function storage unit 204 stores. Updating of the value function Q may be performed by online learning, batch learning, or mini-batch learning. Selection of any of the online learning, batch learning, and mini-batch learning can be performed by the adjustment device 300. The online learning is a learning method of applying an action a to the current state s to update the value function Q immediately every time when the state s makes a transition to a new state s'. The batch learning is a learning method of applying an action a to the current state s to repeat the transition of the state s to the new state s' to collect learning data and perform updating of the value function Q by using all the collected learning data. Further, the mini-batch learning is an intermediate learning method between the online learning and the batch learning, and is a learning method of performing updating of the value function Q every time when certain pieces of learning data are accumulated.

The action information generation unit 2023 selects the action a in a process of the Q-learning, with respect to the current state s. The action information generation unit 2023 generates the action information a in order to cause operation (corresponding to the action a in the Q-learning) of correcting the control parameters $a_i$, $b_j$ in the process of the Q-learning to be performed, to output the generated action information a to the action information output unit 203. More particularly, the action information generation unit 2023, for example, outputs to the action information output unit 203, the action information a causing adding or subtracting of the control parameters $a_i$, $b_j$ included in the state s, incrementally (for example, about 0.01). This action information a is to be parameter correction information.

When increasing or decreasing of the control parameters $a_i$, $b_j$ are applied, a transition is made to the state s', and a positive reward (a reward of a positive value) is given, the action information generation unit 2023 may take, as the next action a', a measure of selecting the action a' such that the value of the position error becomes smaller, such as adding or subtracting incrementally as similar to the previous action, with respect to the control parameters $a_i$, $b_j$.

On the contrary, when a negative reward (a reward of a negative value) is given, the action information generation unit 2023 may take, as the next, action a', for example, a measure of selecting the action a' such that the position error is smaller than the previous value, such as subtracting or adding incrementally on the contrary to the previous action, with respect to the control parameters $a_i$, $b_j$.

The action information output unit 203 is a unit that transmits the parameter correction information that is to be the action information a output from the learning unit 202 to the CNC device 100 via the adjustment device 300 described later. As described above, the CNC device 100 slightly corrects the current state s, that is, the control parameters $a_i$, $b_j$ that are currently set on the basis of the action information, to make a transition to the next state s' (that is, the corrected control parameters $a_i$, $b_j$).

The value function storage unit 204 is a storage device that stores the value function Q. The value function Q may be, for example, stored in a table (hereinafter, referred to as an action value table) for every state s and every action a. The value function Q stored in the value function storage unit 204 is updated by the value function updating unit 2022. The optimizing action information output unit 205 outputs optimizing action information on the basis of the updated value function Q. This optimizing action information includes information of correcting the control parameters $a_i$, $b_j$, as similar to the action information output in the process of the Q-learning by the action information output unit 203. This information of correcting the control parameters $a_i$, $b_j$ is to be the parameter setting information acquired by the machine learning.

In the CNC device 100, the control parameters $a_i$, $b_j$ are corrected on the basis of the parameter correction information. Accordingly, the CNC device 100 can operate to reduce the value of the position error, with the coefficients of the velocity feedforward being highly ordered. As described above, by utilizing the machine learning device 200 according to the present invention, the control parameter adjustment of the velocity feedforward calculation unit 1021 of the CNC device 100 is simplified.

<Adjustment Device 300>

Next, the adjustment device 300 in the first embodiment will be described. FIG. 6 is a block diagram showing a configuration example of the adjustment device 300. The adjustment device 300 includes a feedback information transmission unit 301, a parameter setting information acquisition unit 302, a parameter correction information acquisition unit 303, a start command output unit 304, an evaluation program storage unit 305, an evaluation program output unit 306, an evaluation program execution command output unit 307, a feedback information acquisition unit 308, a parameter setting information transmission unit 309, a parameter correction information transmission unit 310, a parameter initial setting transmission unit 311, and a control unit 312. The control unit 312 controls operation of each component.

The feedback information transmission unit 301, the parameter setting information acquisition unit 302, the parameter correction information acquisition unit 303, and the start command output unit 304 are components provided for a transmission and reception interface with the machine learning device 200. The evaluation program storage unit 305, the evaluation program output unit 306, the evaluation program execution command output unit 307, the feedback information acquisition unit 308, the parameter setting information transmission unit 309, the parameter correction information transmission unit 310, and the parameter initial setting transmission unit 311 are components provided for a transmission and reception interface with the CNC device 100. The control unit 312 performs storage of the evaluation program in the evaluation program storage unit 305, correction of the stored evaluation program, and the like.

Figure 7A:
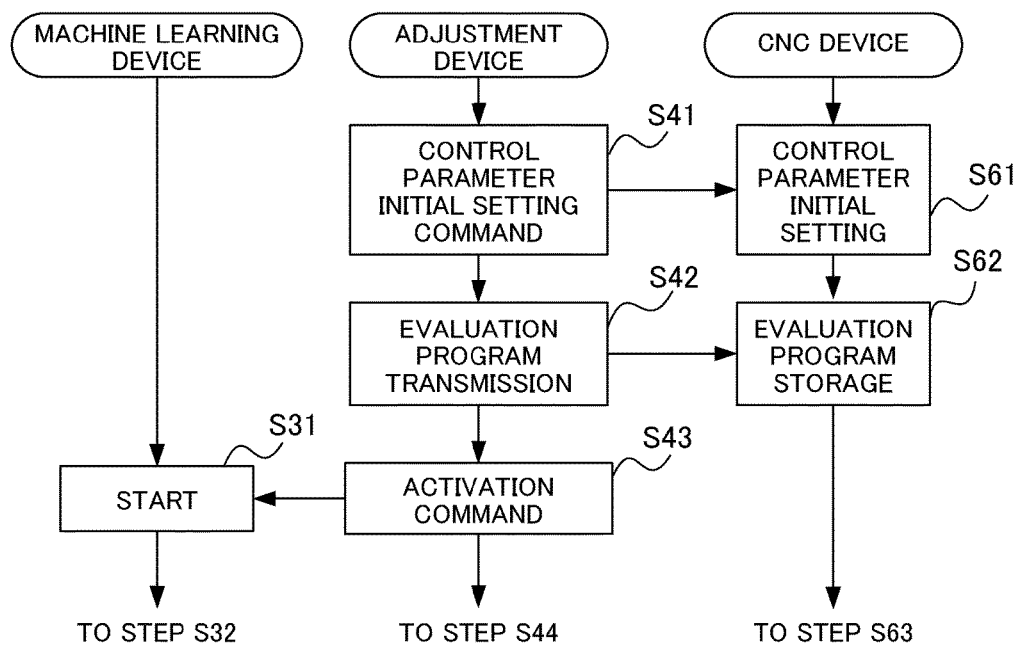
FIG. 7A is a flowchart explaining start operation of the adjustment system 10.
Figure 7C:
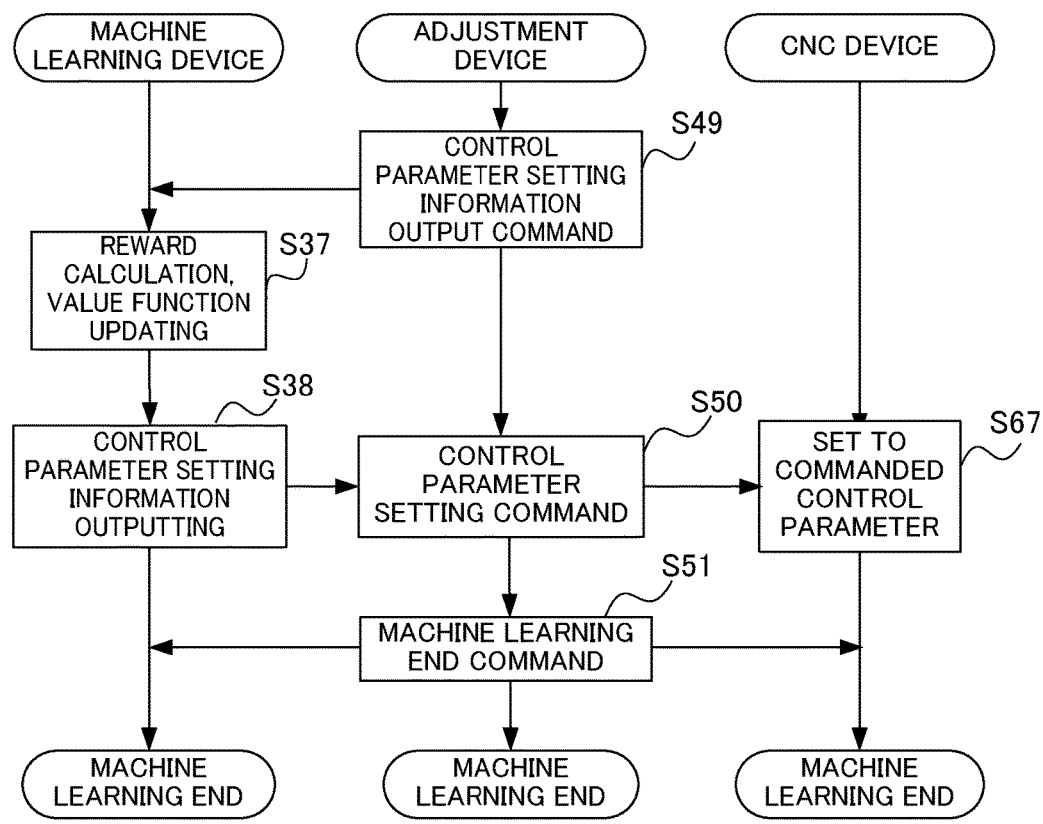
FIG. 7C is a flowchart explaining parameter setting information output operation of the adjustment system 10.

Operation of the adjustment system, mainly, the operation of the adjustment device 300 will be described below with reference to FIG. 7A, FIG. 71B, and FIG. 7C. FIG. 7A is a diagram showing a flow of start operation of the adjustment system. The control unit 312 of the adjustment device 300 first gives a command of control parameter initial setting to the CNC device 100 via the parameter initial setting transmission unit 311, at step S41. Particularly, the control unit 312 of the adjustment device 300 gives a command to the velocity feedforward calculation unit 1021 to, for example, set the coefficients $a_i$, $b_j$ as the initial set values, to be $a_0=1$, $a_1=0$, $b_0=0$, and $b_1=$(an inertia value of a control target) of formula 1, and set dimensions m, n of the coefficients $a_i$, $b_j$. The CNC device 100 sets the values of the coefficients $a_i$, $b_j$, and the dimensions m, n of the velocity feedforward calculation unit 1021 on the basis of the commend from the adjustment device 300, at step 561.

Next, the control unit 312 of the adjustment device 300 transmits the evaluation program to the CNC device 100 via the evaluation program output unit 306 at step S42. Particularly, the control unit 312 gives a command to the evaluation program output unit 306 to transmit the evaluation program, and the evaluation program output unit 306 reads the evaluation program from the evaluation program storage unit 305, and transmits the evaluation program to the CNC device 100. The numerical control information processing unit 1011 of the CNC device 100 stores the evaluation program in the storage unit 1012 at step S62.

Next, the control unit 312 of the adjustment device 300 gives a start command to the machine learning device 200 via the start command output unit 304 at step S43. The machine learning device 200 receives the start command from the adjustment device 300, starts the device, and then makes the device to be in a stand-by state at step S31. Next, learning operation of the adjustment system 10 will be described with reference to FIG. 7B. FIG. 7B is a flowchart explaining the learning operation of the adjustment system. 10. The control unit 312 of the adjustment device 300 gives a command to the numerical control information processing unit 1011 of the CNC device 100 via the evaluation program execution command output unit 307, to execute the evaluation program at step S44.

After receiving the execution command from the adjustment device 300, the numerical control information processing unit 1011 of the CNC device 100 reads the evaluation program from the storage unit 1012 and generates a position command value on the basis of the evaluation program, at step S63. The CNC device 100 controls the servo motor 600, and transmits to the adjustment device 300, feedback information including values of the coefficients $a_i$, $b_j$ (i, j≥0) of the transfer function of the velocity feedforward calculation unit 1021, and the position error information of the CNC device 100 acquired by executing the evaluation program, at step S64. This feedback information is the state information s. The control unit 312 of the adjustment device 300 acquires the feedback information via the feedback information acquisition unit 308, and transmits the feedback information to the machine learning device 200 via the feedback information transmission unit 301 at step S45. The machine learning device 200 receives the feedback information at step S32.

The CNC device 100 determines whether a series of machining by the evaluation program has ended, at step S65. The state where the series of machining by the evaluation program has ended refers to, for example, a state where the evaluation program in which the geometry is a circle, a square, or a square with quarter arcs R, has ended. If the series of machining by the evaluation program has not ended (NO at step S65), the CNC device 100 returns to step S63. If the series of machining by the evaluation program has ended (YES at step 565), the CNC device 100 notifies the adjustment device 300, of ending of the series of machining by the evaluation program. When notified of ending of the series of machining by the evaluation program, the control unit 312 of the adjustment device 300 records and updates the number of receiving of the notification of ending of the evaluation program. The control unit 312 of the adjustment device 300 determines whether the number exceeds a predetermined number, or a predetermined learning period has passed, to determine whether the control unit 312 ends the machine learning, at step 546. When the machine learning is not ended (NO at step 546), the adjustment device 300 proceeds to step 547. When the machine learning is ended (YES at step 546), the adjustment device 300 proceeds to step 549. The adjustment device 300 gives a command of reward calculation and value function updating, to the machine learning device 200 at step 547.

When receiving the command of reward calculation and value function updating at step S33, the machine learning device 200 determines whether the control parameters received from the CNC device 100, that is, the values of coefficients $a_i$, $b_j$ (i, j≥0) (the values of the control parameters) of the transfer function of the velocity feedforward calculation unit 1021, are the initial set values, at step S34. In other words, the machine learning device 200 determines whether the control parameter is set of an initial set value (state information) $s_0$, or a set of the state information s after the initial set value (state information) $s_0$. When the control parameter is not the set of the initial set value (state information) $s_0$, and is the set of the state information s after the initial set value (state information) $s_0$ (NO at step S34), the machine learning device 200 proceeds to step S35. When the value of the control parameter is the initial set value (YES at step S34), the machine learning device 200 proceeds to step S36.

The machine learning device 200 calculates the reward, and updates the value function at S35, and then, proceeds to step S36. The machine learning device 200 generates the control parameter correction information, and transmits the control parameter correction information to the adjustment device 300 at step S36. The control parameter correction information is, for example, information causing adding or subtracting of the coefficients $a_i$, $b_j$ of the velocity feedforward calculation unit included in the action a, incrementally (for example, about 0.01), with respect to the coefficients of the velocity feedforward calculation unit included in the state s.

The adjustment device 300 transmits the control parameter correction information received from the machine learning device 200 to the velocity feedforward calculation unit 1021 of the CNC device 100 at step S48.

When receiving the control parameter correction information, the velocity feedforward calculation unit 1021 corrects the coefficients $a_i$, $b_j$ at step S66, and the CNC device 100 returns to step S63. Thereby, the CNC device 100 repeats the series of machining by the evaluation program on the basis of the control parameters after the correction.

Next, control parameter setting information output operation of the adjustment system 10 will be described. FIG. 7C is a flowchart explaining the control parameter setting information output operation of the adjustment system 10. The control parameter setting information output operation is operation of after the machine learning is determined to be ended at step S46. The control parameter setting information is optimizing action information. As shown in FIG. 7C, the control unit 312 of the adjustment device 300 transmits an output command of the control parameter setting information to the machine learning device 200 at step S49. When receiving the output command of the control parameter setting information that is to be the optimizing action information, the machine learning device 200 calculates the reward corresponding to the last machine learning and updates the value function at step S37. The optimizing action information output unit 205 of the machine learning device 200 acquires the value function Q stored in the value function storage unit 204, then, for example, generates the control parameter setting information that is to be the optimizing action information with respect to the initial state $s_0$, on the basis of the acquired value function Q and outputs the control parameter setting information generated to the adjustment device 300 at step S38. Once acquiring the control parameter setting information, the adjustment device 300 outputs the control parameter setting information to the CNC device 100 at step S50. The CNC device 100 sets the coefficients $a_i$, $b_j$ of the velocity feedforward calculation unit 1021 to be optimal values, on the basis of the control parameter setting information received from the adjustment device 300, at step S67. The adjustment device 300 transmits a learning end command to the CNC device 100 and the machine learning device 200 at step S51, and ends the learning. When receiving the learning end command from the adjustment device 300, the CNC device 100 and the machine learning device 200 ends the learning.

The operation of the CNC device 100, the machine learning device 200, and the adjustment device 300 is described above on the basis of the processing flow. However, the processing flow described above is only an example. The processing flow is not limited thereto. In order to realize these functions, each of the CNC device 100, the machine learning device 200, and the adjustment device 300 includes an operation processing device such as a central processing unit (CPU). Each of the CNC device 100, the machine learning device 200, and the adjustment device 300 further includes: an auxiliary storage device such as a hard disk drive (HDD) in which various controlling programs such as application software and an operating system (OS) are stored; and a main storage device such as a random access memory (RAM) for storing data temporarily required for execution of a program by the operation processing device.

In each of the CNC device 100, the machine learning device 200, and the adjustment device 300, the operation processing device reads application software and an OS from the auxiliary storage device, and performs operation processing based on these application software and the OS while decompressing the read application software and the OS to the main storage device. The operation processing device controls various hardware included in each device, on the basis of the operation result. Thereby, the function blocks of the present embodiment are realized. That is, the present embodiment can be realized by cooperation of the hardware and the software.

The machine learning device 200 performs a large amount of operation associated with the machine learning. Thus, it is desirable that, for example, a personal computer is mounted with graphics processing units (GPUs), and the GPU are utilized for the operation processing associated with the machine learning by a technique called general-purpose computing on graphics processing units (GPGPU), so that the machine learning device 200 can perform high speed processing. Further, in order to perform higher speed processing, a plurality of such computers mounted with the GPU may be used to construct a computer cluster, so that parallel processing is performed by the plurality of computers included in the computer cluster.

Various modifications of the first embodiment described above are possible. For example, in the velocity feedforward calculation unit 1021 of the CNC device 100, the control parameters may be initially set in advance. In this case, the parameter initial setting transmission unit 311 of FIG. 6, and step S41 of the adjustment device 300 and step S61 of the CNC device 100 of FIG. 7A may not be provided.

The CNC device 100 may store the evaluation program in the storage unit 1012 in advance. In this case, the evaluation program storage unit 305 and the evaluation program output unit 306 of the adjustment device 300, and step S42 of the adjustment device 300 and step S62 of the CNC device 100 of FIG. 7A may not be provided.

Instead of the evaluation program execution command output unit 307, and step S44 of the adjustment device 300 of FIG. 7A, the CNC device 100 may execute the evaluation program according to the command of the operator at step S63.

Transmission and reception of a signal between the CNC device 100 and the machine learning device 200 may be directly performed not via the adjustment device 300. In this case, the feedback information acquisition unit 308 and the feedback information transmission unit 301 of the adjustment device 300, and reception and transmission of the feedback information by the adjustment device 300 at step 545 described in FIG. 7B, may not be provided.

Similarly, reception of the notification of ending of the series of machining by the evaluation program, and transmission of the command of reward calculation and updating of the value function, by the adjustment device 300 at step S46 described in FIG. 7B of the adjustment device 300 may not be performed.

Second Embodiment

Figure 8:
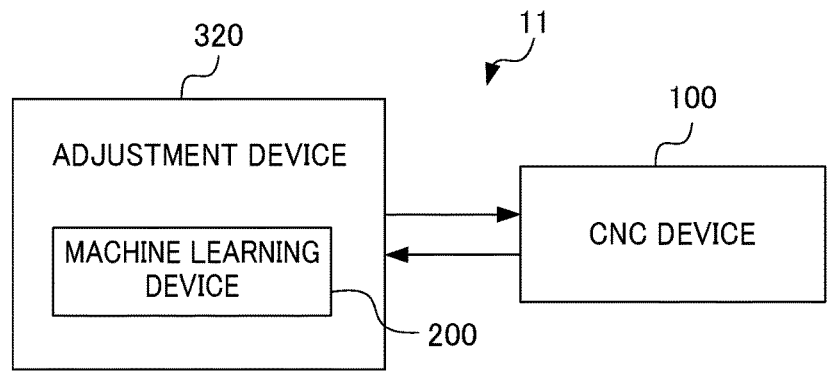
FIG. 8 is a block diagram showing an adjustment system of a second embodiment of the present invention.

FIG. 8 is a block diagram showing an adjustment system of a second embodiment of the present invention. The configurations of the CNC device and the machine learning device of the present embodiment are the same as the configurations of the CNC device 100 and the machine learning device 200 shown in FIG. 2, FIG. 3, and. FIG. 5. Thus, they are added with the same numerals and description thereof is omitted. The adjustment system 11 of the present embodiment has a configuration in which the adjustment device 320 includes the machine learning device 200. The configuration of the adjustment device 320 is the same as the configuration of the adjustment device 300 shown in FIG. 6, excluding the machine learning device 200. The adjustment device 320 and the CNC device 100 are directly connected via the connection interface, or connected via the network, and can communicate with each other. The network is, for example, a local area network (LAN) constructed in a factory, the Internet, a public telephone network, or combination thereof. Particular communication method in the network, which of wired connection and wireless connection is used, and the like, are not limited particularly.

Third Embodiment

Figure 9:
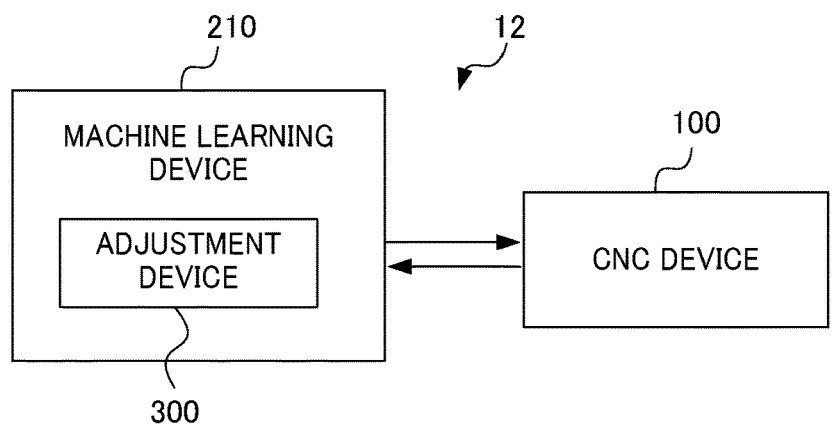
FIG. 9 is a block diagram showing an adjustment system of a third embodiment of the present invention.

FIG. 9 is a block diagram showing an adjustment system of the third embodiment of the present invention. The configurations of the CNC device and the adjustment device of the present embodiment are the same as the configurations of the CNC device 100 and the adjustment device 300 shown in FIG. 2, FIG. 3, and FIG. 6. Thus, they are added with the same numerals and description thereof is omitted. The adjustment system 12 of the present embodiment has a configuration in which a machine learning device 210 includes the adjustment device 300. The configuration of the machine learning device 210 is the same as the configuration of the machine learning device 200 shown in FIG. 5, excluding the adjustment device 300. The CNC device 100 and the machine learning device 210 are directly connected via the connection interface, or connected via the network, and can communicate with each other. The network is, for example, a local area network (LAN) constructed in a factory, the Internet, a public telephone network, or combination thereof. Particular communication method in the network, which of wired connection and wireless connection is used, and the like are not limited particularly.

Fourth Embodiment

Figure 10:
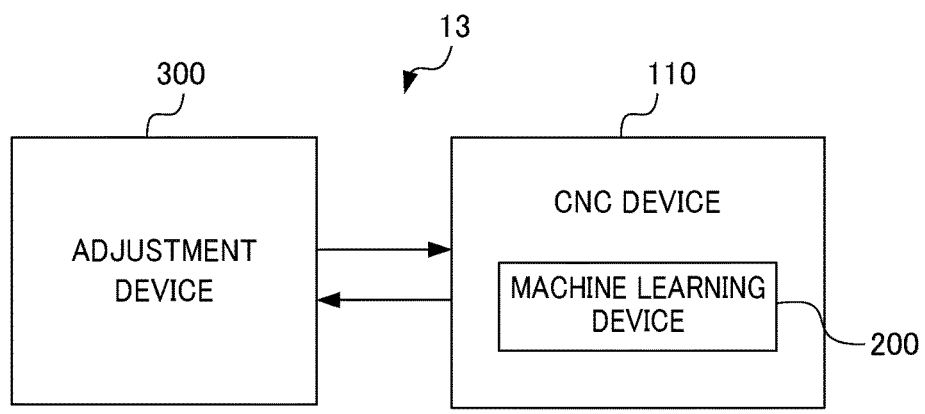
FIG. 10 is a block diagram showing an adjustment system of a fourth embodiment of the present invention.

FIG. 10 is a block diagram showing an adjustment system of a fourth embodiment of the present invention. The configurations of a machine learning device and an adjustment device of the present embodiment are the same as the configurations of the machine learning device 200 and the adjustment device 300 shown in FIG. 2, FIG. 5, and FIG. 6. Thus, they are added with the same numerals and description thereof is omitted. The adjustment system 13 of the present embodiment has a configuration in which the CNC device 110 includes the machine learning device 200. The configuration of the CNC device 110 is the same as the configuration of the CNC device 100 shown in FIG. 3, excluding the machine learning device 200. The CNC device 110 and the adjustment device 300 are directly connected via the connection interface, or connected via the network, and can communicate with each other.

Fifth Embodiment

Figure 11:
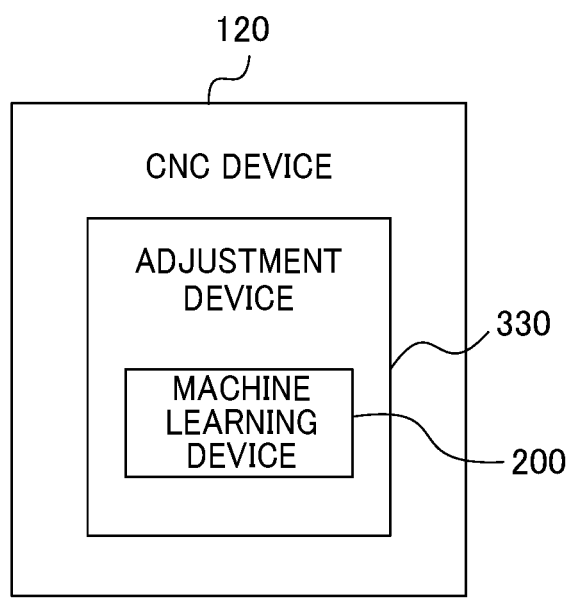
FIG. 11 is a block diagram showing a CNC device of a fifth embodiment of the present invention.

FIG. 11 is a block diagram showing a CNC device of a fifth embodiment of the present invention. The CNC device 120 of the present embodiment includes the adjustment device 330, and the adjustment device 330 includes the machine learning device 200. The configuration of the CNC device 120 is the same as the configuration of the CNC device 100 shown in FIG. 3, excluding the adjustment device 330 including the machine learning device 230. The CNC device 120 includes a control unit having the same configuration as that of the CNC device 100. In the present embodiment, application software executing functions of the adjustment device 330 including the functions of the machine learning device 200 is executed on an operation system of the CNC device 120.

Sixth Embodiment

Figure 12:
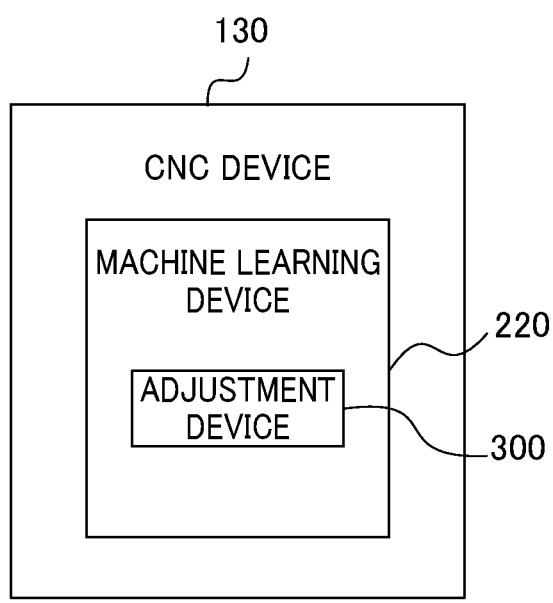
FIG. 12 is a block diagram showing a CNC device of a sixth embodiment of the present invention.

FIG. 12 is a block diagram showing a CNC device of a sixth embodiment of the present invention. A CNC device 130 of the present embodiment includes the machine learning device 220, and the machine learning device 220 includes the adjustment device 300. The configuration of the CNC device 130 is the same as the configuration of the CNC device 100 shown in FIG. 3, excluding the machine learning device 220 including the adjustment device 300. The CNC device 130 includes a control unit having the same configuration as that of the CNC device 100. In the present embodiment, application software executing functions of the machine learning device 220 including the adjustment device 300 is executed on an operation system of the CNC device 130.

Each component included in the CNC devices 100 to 130, the machine learning devices 200 to 220, and the adjustment devices 300, 320, 330 described above can be realized by hardware, software or combination thereof. The servo control method performed by cooperation of each of the components included in the servo control device described above, also may be realized by hardware, software, or combination thereof. Being realized by software means being realized by reading and executing a program by a computer.

The program may be stored by using various types of non-transitory computer readable media, and supplied to the computer. The non-transitory computer readable media include various types of tangible storage media. Examples of the non-transitory computer readable media include a magnetic recording medium (for example, a flexible disk, a magnetic tape, and a hard disk drive), a magneto-optical recording medium (for example, a magneto-optical disk), a CD-ROM (read only memory), a CD-R, a CD-R/W, a semiconductor memory (for example, a mask ROM, a programmable ROM (PROM), an erasable PROM (EPROM), a flash ROM, and a random access memory (RAM)).

Although the embodiment described above is a preferable embodiment of the present invention, the scope of the present invention is not limited thereto. The present invention may be performed in an embodiment in which various modifications are performed without departing from the scope of the present invention.

Figure 13:
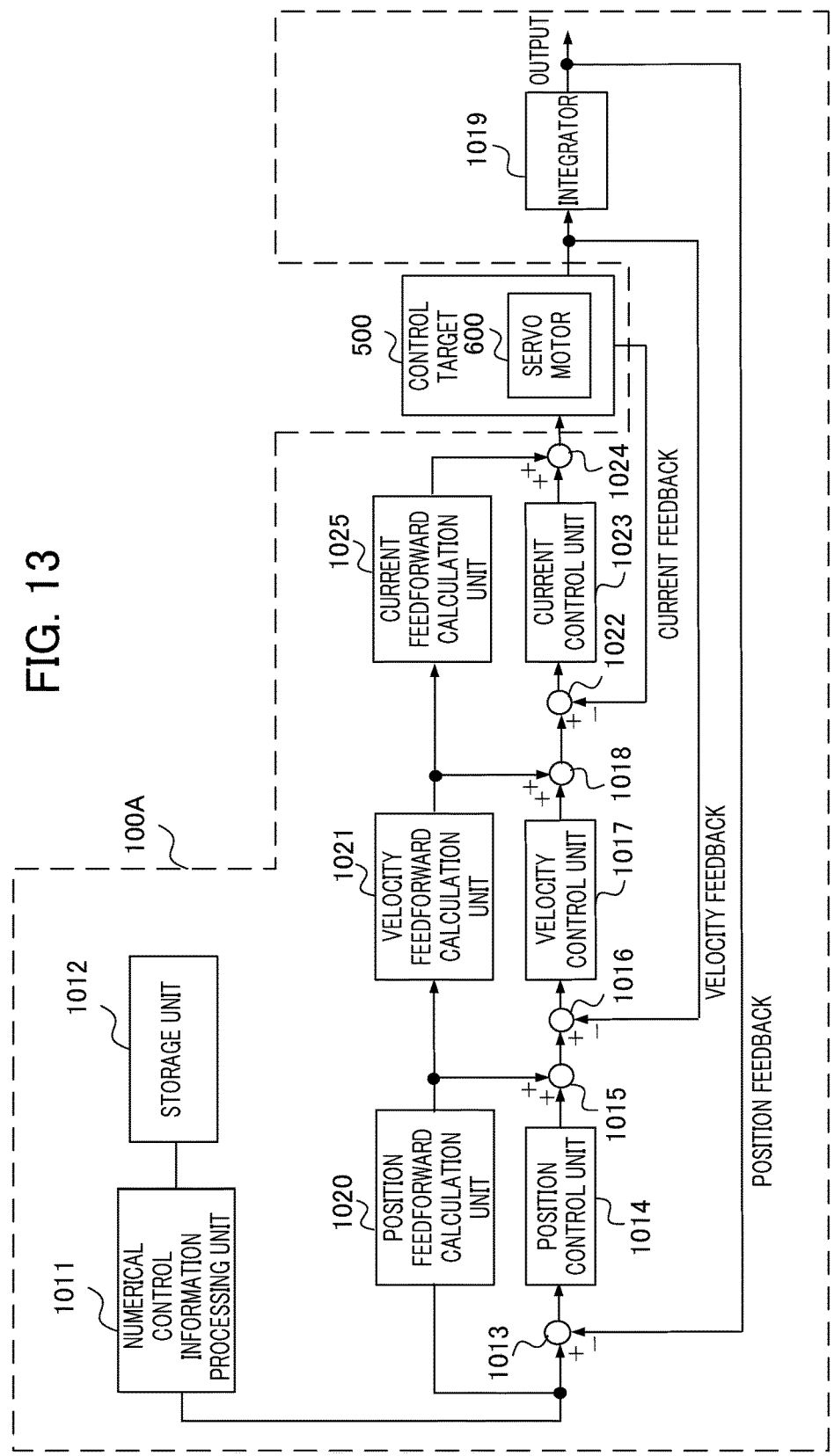
FIG. 13 is a block diagram showing another configuration example of the CNC device of the embodiments of the present invention.

For example, the configuration of the CNC device of the present embodiment is not limited to the configuration shown in FIG. 3. FIG. 13 is a block diagram showing another configuration example of the CNC device of the present embodiment. The difference between the CNC device 100A shown in FIG. 13 and the CNC device 100 shown in FIG. 3 is a configuration in which the CNC device 100A show in FIG. 13 further includes a subtractor 1022, a current control unit 1023, an adder 1024, and a current feedforward calculation unit 1025, and performs current feedback.

The machine learning devices 200, 210, 220 of the embodiments described above are examples in which the CNC device 100 executes an evaluation program, to acquire state information including the position error, and combination of the coefficients of the transfer function of the velocity feedforward calculation unit 1021, as feedback information, and outputs the action information including the adjustment information of combination of coefficients included in the state information, to the velocity feedforward calculation unit 1021 of the CNC device 100, to perform reinforcement learning. The machine learning by the machine learning device is not limited to the machine learning of the coefficients in the velocity feedforward calculation unit 1021. For example, the machine learning device may perform the machine learning (reinforcement learning) of the coefficients (control parameters) of the transfer function of the position feedforward calculation unit 1020 and/or a current feedforward calculation unit 1025, in addition to the velocity feedforward calculation unit 1021, or instead of the velocity feedforward calculation unit 1021.

In the first embodiment, the feedback information for performing the reinforcement learning by the machine learning device includes the combination of the position error, and the coefficients of the transfer function of the velocity feedforward calculation unit 1021. However, the feedback information is not limited to the position error, and may include at least one of the position command and the position feedback (position detection value) in addition to the position error. In addition, the feedback information may include at least one of the velocity command, the velocity feedback, the velocity error, the current command, the current feedback, and the current error, in addition to the position error. An output of the numerical control information processing unit 1011 corresponds to the position command, and an output of the integrator 1019 corresponds to the position feedback. An output of the adder 1015 corresponds to the velocity command, an output of the rotary encoder associated to the servo motor 600 corresponds to the velocity feedback (velocity detection value), and an output of the subtractor 1016 corresponds to the velocity error. An output of the adder 1018 corresponds to the current command, a detection value of the current flowing in the servo motor 600 corresponds to the current feedback, and an output of the subtractor 1022 corresponds to the current error. The embodiments described above are described as examples related to reinforcement learning. However, the present invention may be applied to other techniques, for example, "learning with a teacher", or "learning without a teacher".

The feedback information can be selected as appropriate by a target of the machine learning, or a method of the machine learning.

<Degree of Freedom of System Configuration>

In the embodiment shown in FIGS. 1 and 2 described above, the CNC device 100 and the machine learning device 200 are communicatively connected as a set of one-to-one. However, for example, one machine learning device 200 may be communicatively connected with a plurality of CNC devices 100 via the network 400 to perform machine learning of each of the CNC devices 100. At that time, respective functions of the machine learning device 200 may be realized as a distributed processing system in which the functions are distributed in a plurality of servers, as appropriate. The functions of the machine learning device 200 may be realized by utilizing a virtual server function, or the like, in a cloud.

When there are a plurality of machine learning devices 200-$i$ to 200-$n$ corresponding to a plurality of CNC devices 100-1 to 100-$n$, respectively, of the same type name, the same specification, or the same series, the machine learning devices 200-1 to 200-$n$ may be configured to share learning results in the machine learning devices 200-1 to 200-$n$. Thereby, more optimal model can be constructed. In the second and fourth embodiments shown in FIG. 8 and FIG. 10, one adjustment device is provided to one CNC device. However, one adjustment device may be provided to a plurality of CNC devices. In the third embodiment shown in FIG. 9, one machine learning device is provided to one CNC device. However, one adjustment device may be provided to a plurality of CNC devices.

EXPLANATION OF REFERENCE NUMERALS 10-13 Adjustment system
100, 110, 120, 130 CNC device 200, 210 Machine learning device
300, 310 Adjustment device
301 Feedback information transmission unit
302 Parameter setting information acquisition unit
303 Parameter correction information acquisition unit
304 Start command output unit
305 Evaluation program storage unit
306 Evaluation program output unit
307 Evaluation program execution command output unit
308 Feedback information acquisition unit
309 Parameter setting information transmission unit
310 Parameter correction information transmission unit
311 Parameter initial setting transmission unit
312 Control unit

What is claimed is:

1. An adjustment device that controls a control device configured to control motors driving at least two axes, and a machine learning device configured to perform machine learning with respect to the control device, the adjustment device comprising:
    a start command output unit configured to output a start command for starting the machine learning device;
    a feedback information acquisition unit configured to acquire feedback information acquired on the basis of an evaluation program executed by the control device, from the control device;
    a feedback information transmission unit configured to transmit the feedback information acquired, to the machine learning device;
    a parameter setting information acquisition unit configured to acquire control parameter setting information acquired by machine learning using the feedback information, from the machine learning device; and
    a parameter setting information transmission unit configured to transmit the control parameter setting information acquired, to the control device.

2. The adjustment device according to claim 1, further comprising: a storage unit configured to store the evaluation program; and an evaluation program output unit configured to output the evaluation program to the control device.

3. The adjustment device according to claim 1, further comprising an evaluation program execution command output unit configured to transmit an execution command for causing the evaluation program to be executed, to the control device.

4. The adjustment device according to claim 1, wherein, when two or more axes are driven by the motors, the feedback information acquisition unit acquires the feedback information from the control device, to transmit the feedback information to the machine learning device.

5. The adjustment device according to claim 1, wherein the feedback information includes at least one of a position command, position feedback, and position error.

6. The adjustment device according to claim 5, wherein the feedback information further includes at least one of a velocity command, velocity feedback, and velocity error.

7. The adjustment device according to claim 5, wherein the feedback information further includes at least one of a current command, current feedback, and current error.

8. The adjustment device according to claim 1, wherein the machine learning is reinforcement learning, the feedback information acquisition unit acquires the feedback information as state information from the control device, and
    the adjustment device comprises a parameter correction information transmission unit configured to transmit control parameter correction information acquired from the machine learning device, as action information, to the control device.

9. The adjustment device according to claim 1, wherein the control device comprises at least one of a position feedforward calculation unit, a velocity feedforward calculation unit, and a current feedforward calculation unit, and at least one of the position feedforward calculation unit, the velocity feedforward calculation unit, and the current feedforward calculation unit is performed with setting of a control parameter by the control parameter setting information.

10. The adjustment device according to claim 1, wherein the control device stores the evaluation program.

11. The adjustment device according to claim 1, comprising the machine learning device.

12. The adjustment device according to claim. 1, comprised in the machine learning device.

13. The adjustment device according to claim 1, wherein the control device comprises the machine learning device.

14. The adjustment device according to claim 1, comprised in the control device, and comprising the machine learning device.

15. The adjustment device according to claim 1, wherein the adjustment device is comprised in the machine learning device, and the machine learning device is comprised in the control device.

16. An adjustment method of an adjustment device that controls a control device configured to control motors driving at least two axes, and a machine learning device configured to perform machine learning with respect to the control device, the adjustment method comprising:
    starting the machine learning device;
    acquiring feedback information acquired on the basis of an evaluation program executed by the control device, from the control device;
    transmitting the feedback information acquired, to the machine learning device;
    acquiring control parameter setting information acquired by machine learning using the feedback information, from the machine learning device; and
    transmitting the control parameter setting information acquired, to the control device.

* * * * *